(12) United States Patent
Beckmann et al.

(10) Patent No.: US 9,301,195 B2
(45) Date of Patent: Mar. 29, 2016

(54) METHOD, SYSTEM AND DEVICE FOR PERFORMING A REGISTRATION PROCEDURE OF A MOBILE TERMINAL DEVICE IN A MOBILE COMMUNICATIONS NETWORK

(75) Inventors: Steffen Beckmann, Buxtehude (DE); Jörg Brenner, Hamburg (DE); Carl Mathias Cramer, Henstedt-Ulzburg (DE); Aleksej Dorn, Buchholz (DE); Florian Wolff, Hamburg (DE)

(73) Assignee: SIEMENS CONVERGENCE CREATORS GMBH & CO. KG, Hamburg (DE)

( * ) Notice: Subject to any disclaimer, the term of this patent is extended or adjusted under 35 U.S.C. 154(b) by 1201 days.

(21) Appl. No.: 12/514,845

(22) PCT Filed: Oct. 29, 2007

(86) PCT No.: PCT/EP2007/061578
§ 371 (c)(1),
(2), (4) Date: May 14, 2009

(87) PCT Pub. No.: WO2008/058843
PCT Pub. Date: May 22, 2008

(65) Prior Publication Data
US 2010/0081437 A1    Apr. 1, 2010

(30) Foreign Application Priority Data

Nov. 14, 2006  (EP) .................................... 06124044

(51) Int. Cl.
*H04W 4/00* (2009.01)
*H04W 28/06* (2009.01)
*H04W 60/00* (2009.01)
*H04W 92/12* (2009.01)

(52) U.S. Cl.
CPC .............. *H04W 28/06* (2013.01); *H04W 60/00* (2013.01); *H04W 92/12* (2013.01)

(58) Field of Classification Search
CPC ...... H04W 28/06; H04W 60/00; H04W 92/12
See application file for complete search history.

(56) References Cited

U.S. PATENT DOCUMENTS

2004/0024791 A1* 2/2004 Martin et al. ................. 707/200
2005/0124344 A1* 6/2005 Laroia et al. ................. 455/436
(Continued)

FOREIGN PATENT DOCUMENTS

WO   WO 01/63775 A2   8/2001

OTHER PUBLICATIONS

GSM TS 04.08 chapter 3.3.1.1.2 (Version 7.21.0 Release 1998).

*Primary Examiner* — Wayne Cai

(57) ABSTRACT

A method, system and device are provided for carrying out a login procedure of a mobile terminal into a mobile communications network. To compensate for a time delay on the communications channel between a base station and a control unit, a device is inserted into the connection between the base station and the control unit. The device is arranged between the base station and the section which is subject to time delay in the communications channel. The device stores the query reference broadcast by the mobile terminal device during each initiation of a login procedure and replaces the query reference in the reply with the query reference currently stored in this device. Thus, the mobile terminal device can carry out the login procedure even in the presence of time delays on the connection between the base station and the control unit.

8 Claims, 4 Drawing Sheets

(56) References Cited

U.S. PATENT DOCUMENTS

| | | | |
|---|---|---|---|
| 2005/0259614 A1* | 11/2005 | Farineau et al. | 370/328 |
| 2006/0072520 A1* | 4/2006 | Chitrapu et al. | 370/337 |
| 2006/0215617 A1* | 9/2006 | Martin | 370/337 |
| 2007/0123252 A1* | 5/2007 | Tronc et al. | 455/427 |
| 2009/0219810 A1* | 9/2009 | Polette et al. | 370/229 |

* cited by examiner

METHOD, SYSTEM AND DEVICE FOR PERFORMING A REGISTRATION PROCEDURE OF A MOBILE TERMINAL DEVICE IN A MOBILE COMMUNICATIONS NETWORK

CROSS REFERENCE TO RELATED APPLICATIONS

This application is the US National Stage of International Application No. PCT/EP2007/061578, filed Oct. 29, 2007 and claims the benefit thereof. The International Application claims the benefits of European Patent Office application No. 0612404.6 EP filed Nov. 14, 2006, both of the applications are incorporated by reference herein in their entirety.

TECHNICAL FIELD

The invention relates to a method for performing a registration procedure of a mobile terminal device in a mobile communications network, as well as to a system for performing the method and a device for use in said method.

BACKGROUND ART

Modern cellular digital mobile communications networks have revolutionized mobile communication since the beginning of the 1990s. They have almost completely replaced the existing analog mobile communications networks. Modern standards (in particular GSM, UMTS, CDMA) facilitated a drop in infrastructure and terminal device prices, which led to competition among the telephony providers and to lower charges.

The competition among the companies manufacturing the infrastructure was also promoted as a result of the fact that communication between the network elements was standardized, the interface descriptions and protocols were laid open and consequently mobile communications networks conforming to the aforementioned standards could be built by putting together network elements supplied by any manufacturers. A feature common to all mobile communications networks is that they consist of elements for providing radio coverage (antennas, base stations (in the case of GSM, called "BTS"—Base Transceiver Station), control units (in the case of GSM, called "BSC"—Base Station Controller) and of elements from switching technology (in the case of GSM, called "MSC"—Mobile Switching Center). In addition there also exist various other network elements for accomplishing diverse tasks such as providing a connection to the public telephone system (PSTN), user management and the like.

In the development of these standards attention was focused on providing coverage for the urban and rural area, with cell sizes and interfaces being geared to distances and user densities typical therefor.

If there now exists the desire for mobile communication in areas cut off from conventional infrastructure, such as e.g. remote islands, settlements, aircraft and ships, a possible solution is to set up a complete mobile communications system at said locations and to attach them to the public telephone system by way of, for example, telephone cables, directional radio relay links or satellite radio links. This is associated with very high costs, however. In the case of the use of such a system in an aircraft, the considerable weight of said equipment also constitutes a problem.

If, instead, only the absolutely necessary network elements (terminal devices, base station) are brought to these remote locations and the connection to the rest of the mobile communications system is routed via a transmission system, then the signaling efforts between the mobile terminal device and the mobile communications network that are necessary for registering with the network, but also for setting up a connection, sending an SMS (Short Message Service) or a location update, can fail if said transmission system is subject to a long delay time (e.g. when a satellite radio link is used).

Said registration procedures are based on the fact that messages which contain a request reference are sent by the mobile terminal device to the mobile communications network. The mobile communications network thereupon sends corresponding reply messages to the requesting mobile terminal device. The request references previously transmitted by the mobile terminal device are contained in said messages and thereby enable the mobile terminal device to assign the reply message uniquely. However, the request references transmitted by the mobile terminal device only remain valid for a certain period of time. If a reply message is returned to the mobile terminal device after this time has elapsed (e.g. due to time delays inside the mobile communications network), the reply message is discarded as invalid and the mobile terminal device starts once again to perform a registration procedure. If the time delay continues to be present during this or further registration attempts, the mobile terminal device will not be able to register with said mobile communications network.

Known solutions to this problem are on the one hand careful optimization of the network configuration (in the GSM example, the setting of the so-called cell parameters "max Retrans" and "Tx Integer"), though this too can only provide a remedy up to a maximum signal propagation delay, and the configuring of the mobile communications network in such a way that all the network elements involved in the registration procedure are set up close to the requesting mobile terminal device and only a further interface which can no longer affect the registration procedure (in the GSM example, the so-called "A" interface) is routed via the transmission system with a long time delay. The latter solution involves the already cited disadvantages in terms of higher costs and greater weight.

The signaling of the registration procedure in accordance with the standard "GSM TS 04.08 chapter 3.3.1.1.2 (Version 7.21.0 Release 1998)" shall be described below by way of example. The algorithm of said registration procedure is based on the repeated transmission of signaling requests CHAN RQD on what is termed the random access channel RACH in the direction of the BTS. In this case each CHAN RQD message is provided with a "request reference (Ref.1)" by the mobile terminal device (MS). The mobile communications network (or the base station controller BSC) responds to said message by sending CHAN ACT with the setup of the future signaling channel and thereupon sends what is termed an "immediate assignment message" IMM ASSIGNMENT to the mobile terminal device on the access grant channel AGCH. Said IMM ASSIGNMENT message contains the Ref.1 used by the mobile terminal device and can therefore be assigned by the MS. Since the transmission of the CHAN RQD message is not coordinated with other mobile terminal devices likewise indicating a signaling request, said message can get lost on the air interface. The mobile terminal device therefore repeats the transmission of the CHAN RQD message after a specified period of time (which is determined as a function of the cell configuration S and the Tx-Integer value broadcast by the BTS). For each retransmission the mobile terminal device uses a new reference (Ref n)—and in the process notes only the last three references (Ref n−2, Ref.n−1, Ref.n). Following the transmission of the last repetition of the CHAN RQD message (determined by the Max Retrans value broadcast by the BTS) the mobile terminal device starts the timer T3126 and waits for the arrival of an IMM ASSIGNMENT message matching the last three transmissions. If this timer times out, the mobile terminal device aborts the assignment procedure with the network. The consequence is that a location registration of the mobile, a call setup or the sending of an SMS will fail.

DISCLOSURE OF THE INVENTION

The object underlying the invention is to perform a registration procedure of a mobile terminal device even in the case of a long delay time on the interface between the base station and the control unit.

The object is achieved by means of a method, a system and a device as claimed in the independent claims. Advantageous embodiments are the subject matter of dependent claims.

According to the basic concept of the invention the device disposed in the connection from the base station to the control unit achieves the object in that it stores the request reference transmitted by the mobile terminal device during each initiation of a registration procedure and inserts said stored request reference in a reply message sent by the control unit in such a way that it replaces the request reference contained therein by the request reference currently stored in said device.

As a result the mobile terminal device receives the same reply from the mobile communications network as in the case of a nonexistent time delay. By this means it is possible to achieve the advantage that the mobile terminal device is able to perform the registration process even in the case of time delays that otherwise would make the registration process impossible.

According to an advantageous embodiment of the invention, the function is implemented in a network element inserted into the interface between base station and control unit. This enables an existing mobile communications network to be improved without the need to change already existing network elements.

In a further favorable embodiment of the invention it is beneficial to integrate the function into the base station. This enables a network element to be changed in such a way that it possesses the inventive functionality.

In the event that the mobile communications network is a GSM network the object is achieved as follows:

The main aspect of the method described here is that the CHAN RQD messages transmitted by the mobile terminal device (MS) are filtered by a network element located between the BTS and the transmission link having a long signal propagation delay (e.g. satellite radio link) and the "request references" contained in the messages are stored. If an IMM ASSIGNMENT message now arrives (with the delay due to the channel) from the BSC at said network element, the "request reference" contained in the message is replaced by the "request reference" most recently received in a CHAN RQD and transmitted via the BTS. As a consequence the mobile terminal device receives a network reply before the "request reference" is "forgotten" or, as the case may be, before the timer 3126 times out. As a result the mobile terminal device receives the same reply from the mobile communications network as in the good case described in FIG. 5.

DETAILED DESCRIPTION OF THE INVENTION

Figure 1:
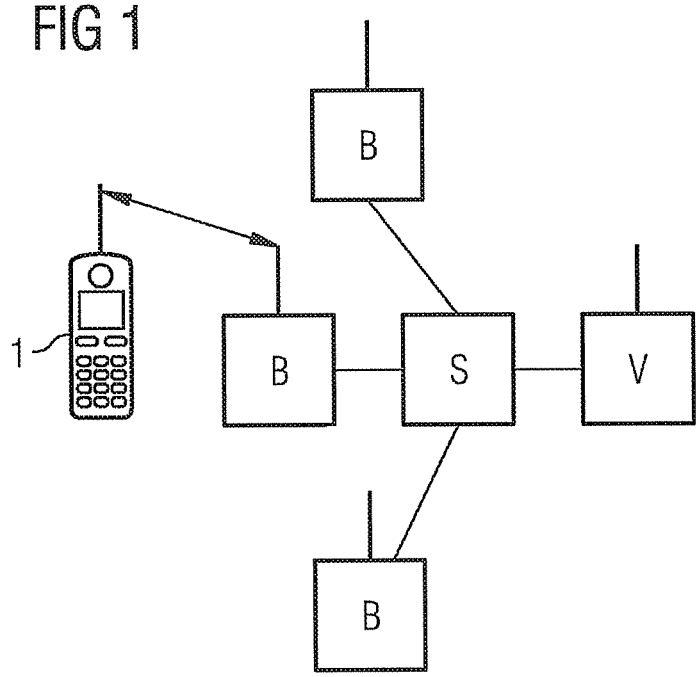
FIG. 1 shows the basic layout of a cellular mobile communications network. The main network elements affected by this invention are shown: mobile terminal device 1, base station B and control unit S, and a switching unit V. Mobile communications networks deployed in real-world scenarios also possess other network elements that are of no relevance to this invention and are connected to the public telephone network (PSTN).

FIG. 1 shows the basic layout of a cellular mobile communications network. Depicted in the figure is a mobile terminal device 1 which is connected to a base station B via a radio link. In this schematic representation the control unit S is simultaneously connected to three base stations. A switching unit V sets up the connection to the public telephone system (not shown here).

Figure 2:
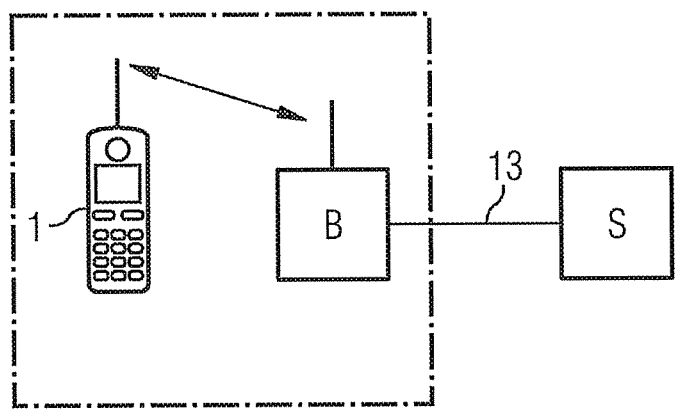
FIG. 2 shows the basic layout of a cellular mobile communications network in the case of the particularly pronounced spatial separation of the network elements base station B and control unit S, e.g. in an application scenario in an aircraft. The framed part represents the remotely deployed network elements. The interface between said two network elements is in this case routed via a channel with a long time delay 13, e.g. via a satellite radio link.

FIG. 2 shows the basic layout of a cellular mobile communications network in the case of the particularly pronounced spatial separation of the network elements base station B and control unit S, e.g. in an application scenario in an aircraft. The framed part represents the remotely deployed network elements. The interface between said two network elements is in this case routed via a channel with a long time delay 13, e.g. via a satellite radio link.

Figure 3:
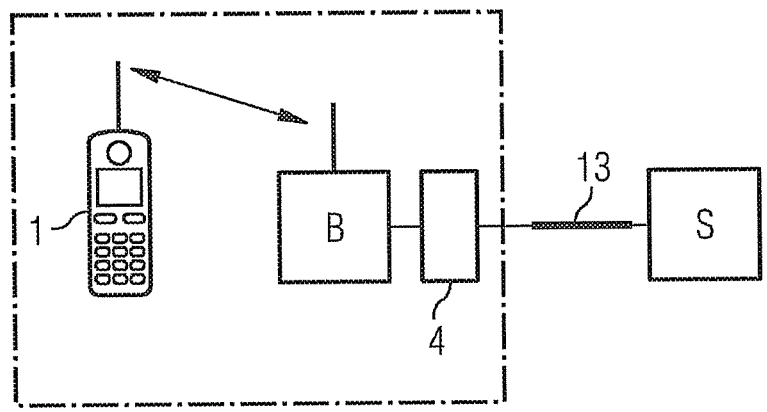
FIG. 3 shows an inventive implementation where the function underlying the invention is realized in a separate network element.

FIG. 3 is a schematic representation of the layout of a mobile communications network in an inventive arrangement of the device underlying the invention. The base station B (which, if the mobile communications network is a GSM network, is called a base transceiver station BTS and is represented as such in the signaling sequence shown in FIG. 7) is connected to the control unit S (which, if the mobile communications network is a GSM network, is called a base station controller BSC and is represented as such in the signaling sequence shown in FIG. 7). The inventive device 4 and the transmission channel with a long signal propagation delay 13 are disposed in the course of this connection. It is essential that the inventive device 4 is disposed between the base station B and the transmission channel with a long signal propagation delay 13.

Figure 4:
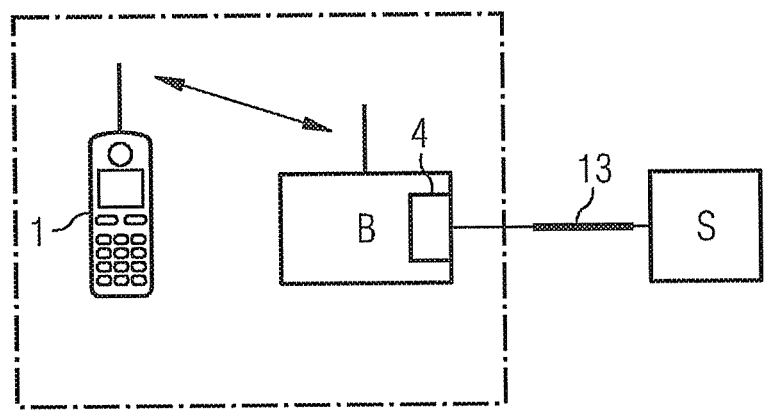
FIG. 4 shows an inventive implementation where the function underlying the invention is integrated into the base station.

FIG. 4 shows the inventive arrangement of the device underlying the invention as claimed in in the claims. In this case the functionality of the inventive device 4 is integrated in the base station B.

Figure 5:
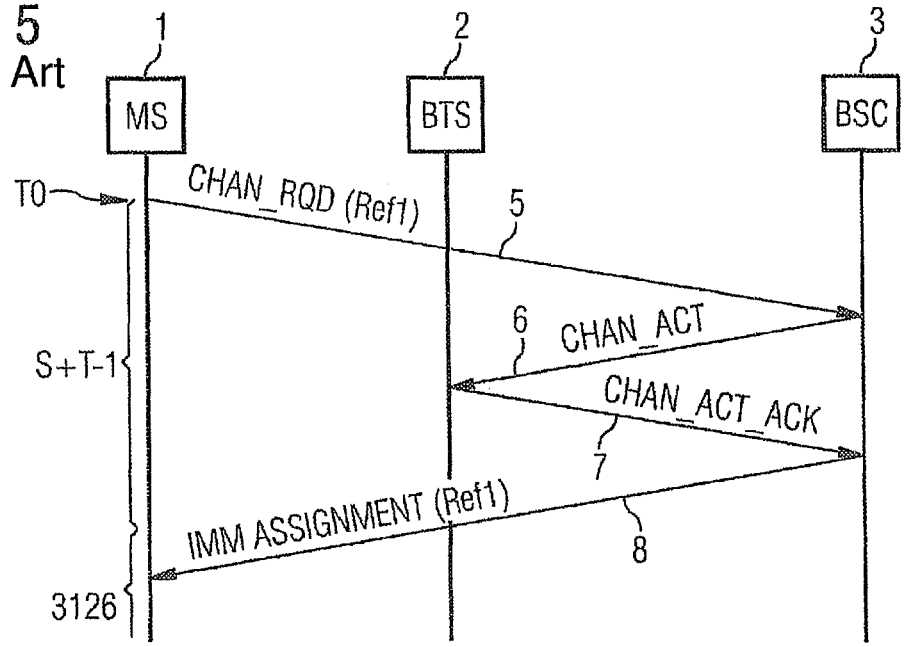
FIG. 5, using the example of the procedure defined in the GSM standard, shows the flow of signaling information that is exchanged between the network elements mobile terminal device MS, BTS and BSC during the execution of a successful "immediate assignment procedure" (good case).

FIG. 5, using the example of GSM, shows the signaling sequence during the execution of an "immediate assignment procedure" in the case of a nonexistent or very short time delay in the connection between base transceiver station 2 and base station controller 3. The mobile terminal device 1 starts the "immediate assignment procedure" at an arbitrary time T0 by transmitting a CHAN_RQD(Ref1) message 5. Said message contains the request reference Ref1. The base station controller 3 thereupon replies by transmitting a CHAN ACT message 6 to the base transceiver station, which thereupon replies with a CHAN ACT ACK message 7. The base station controller 3 replies to the CHAN ACT ACK message 7 by transmitting an IMM ASSIGNMENT(Ref1) message 8. Said message contains the request reference Ref1 introduced by the CHAN_RQD(Ref1) message 5 initiating the registration procedure. Since the IMM ASSIGNMENT(Ref1) message 8 in this example arrives at the mobile terminal device 1 during the run time of the timer 3126, it is acknowledged as valid by the mobile terminal device 1 and the mobile terminal device can thereupon continue the signaling procedure.

Figure 6:
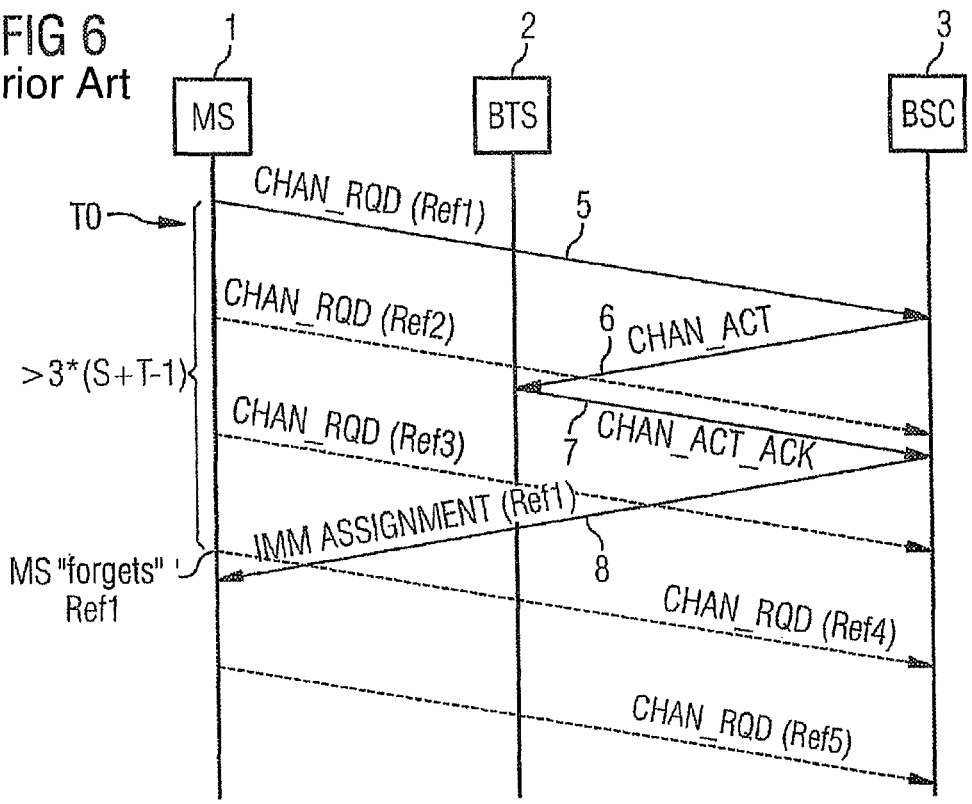
FIG. 6, using the example of the procedure defined in the GSM standard, shows the flow of signaling information that is exchanged between the network elements mobile terminal device MS, BTS and BSC during the execution of an unsuccessful "immediate assignment procedure" (bad case).

FIG. 6, using the example of GSM, shows a signaling sequence during the execution of an "immediate assignment procedure" which fails due to time delay. The signaling sequences are identical to those shown in FIG. 5, although in this example the IMM ASSIGNMENT(Ref1) message 8 arrives at the mobile terminal device 1 after termination of the validity phase. The IMM ASSIGNMENT(Ref1) message 8 is therefore discarded as invalid by the mobile terminal device 1 and the signaling procedure cannot be continued.

Figure 7:
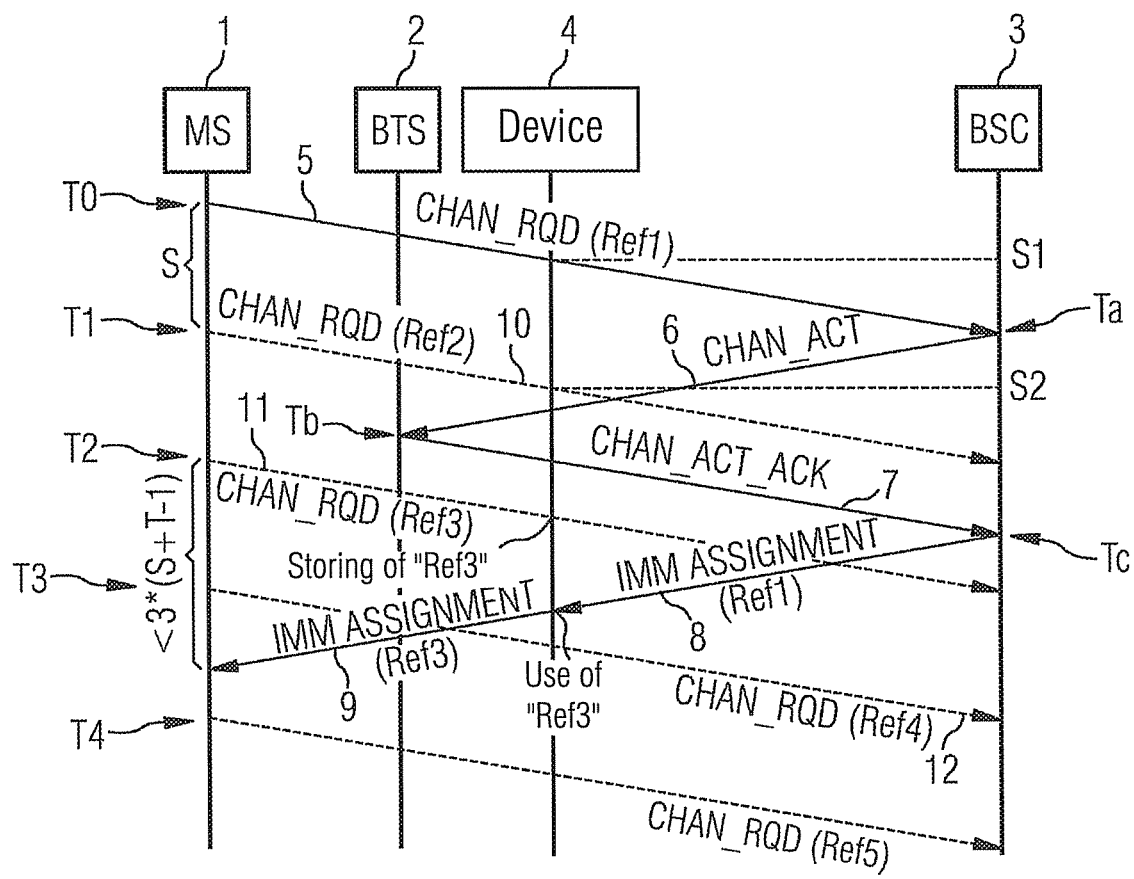
FIG. 7, using the example of the procedure defined in the GSM standard, shows the flow of signaling information that is exchanged between the network elements mobile terminal device MS, BTS and BSC in the case of an implementation according to the invention.

FIG. 7, using the example of GSM, shows the signaling sequence during the execution of an "immediate assignment procedure". In the horizontal direction it depicts the network elements mobile terminal device 1, base transceiver station 2, the inventive device 4, and the base station controller 3. The vertical direction represents the time axis.

The mobile terminal device 1 starts the "immediate assignment procedure" at an arbitrary time T0 by transmitting a CHAN_RQD(Ref1) message 5. Said message contains the request reference Ref1. Due to the time delay on the transmission system from the base transceiver station 2 to the base station controller 3 the message arrives at the base station controller 3 at a time Ta that is dependent on the time delay. The base station controller 3 thereupon replies by transmitting a CHAN ACT message 6 which arrives at the base transceiver station 2 at time Tb after a propagation time determined by the time delay and there initiates the transmission of a CHAN ACT ACK message 7 which arrives at the base station controller 3 at time Tc determined by the time delay. The base station controller 3 replies to the CHAN ACT ACK message 7 by transmitting an IMM ASSIGNMENT(Ref1) message 8. Said message contains the request reference Ref1 introduced by the original CHAN_RQD(Ref1) message 5 initiating the registration procedure.

Meanwhile, after the time period S has elapsed, the mobile terminal device 1 sends a further CHAN_RQD(Ref2) message 10 at time T1, likewise at time T2 (message 11), and at time T3, the request references contained in the message being incremented in each case. The CHAN_RQD(Ref4) message 12 transmitted by the mobile terminal device 1 at time T3 contains the request reference Ref4.

Each time a CHAN_RQD message passes through the inventive device 4, the latter stores the request reference contained in the message. At time S1, the device 4 stores the request reference Ref1 contained in the CHAN_RQD(Ref1) message 5. At time S2, the device 4 stores the request reference Ref2 contained in the CHAN_RQD(Ref2) message 10, etc.

At the time at which the IMM ASSIGNMENT(Ref1) message 8 arrives at the inventive device 4, the request reference Ref3 is stored in the inventive device. According to the invention, the device 4 replaces the request reference Ref1 contained in the IMM ASSIGNMENT(Ref1) message 8 with the request reference Ref3 stored at this time and forwards the IMM ASSIGNMENT(Ref3) message 9 to the mobile terminal device 1. The IMM ASSIGNMENT(Ref3) message 9 arrives at the mobile terminal device 1 at time T4. At this time, in this example, already more than three times the time period S has elapsed, so the mobile terminal device 1 would accordingly not recognize a request reference Ref1 as valid. By means of the inventive device 4 the mobile terminal device 1 receives a reply from the mobile communications network which is acknowledged as valid, since according to the GSM standard mobile terminal devices only acknowledge IMM ASSIGNMENT messages as valid which contain one of the three most recent request references transmitted by the mobile terminal device 1. In the objective case these are the references Ref2, Ref3 and Ref4. An IMM ASSIGNMENT message which contains Ref1 would accordingly be discarded by the mobile terminal device 1.

The invention claimed is:

1. A method for performing a registration procedure of a mobile terminal in a mobile communications network conforming to GSM standards which compensates for a time delay on a communication channel between a base station and a base station control unit, the method comprising:
providing a communications link between the base station and the mobile terminal;
disposing the base station topographically between the communications link and the communications channel;
providing a section of the communications channel that is subject to the time delay between the base station and the control unit;
providing a device in the communication channel between the base station and the section of the communication channel that is subject to the time delay;
storing, by the device, a request reference transmitted in and identifying a request message from the mobile terminal during each initiation of a registration procedure, wherein the registration procedure is an immediate assignment procedure, and the request message is a CHAN RQD message;
receiving, by the device, a reply message transmitted from the control unit in response to the request message, wherein the reply message contains the request reference and is an IMM ASSIGNMENT message; and
replacing the request reference in the received reply message with a last request reference stored by the device from a latest repetition of the request message transmitted from the mobile terminal and received by the device.

2. The method as claimed in claim 1, wherein the device is arranged in a self-contained network element.

3. The method as claimed in claim 1, wherein the device is arranged in the base station.

4. The method as claimed in claim 1, wherein the device is arranged in an aircraft.

5. The method as claimed in claim 1, wherein the device is arranged in a ship.

6. A mobile communications system conforming to a GSM standard, comprising:
a base station which communicates with a mobile terminal;
a base station control unit having a connection with the base station via a satellite link;

wherein the base station is disposed topographically between a communications link to the mobile terminal and the satellite link;
a device connected between the base station and the satellite link;
wherein the device stores a request reference from a last one of a series of repeated request messages transmitted by the mobile terminal during each initiation of a registration procedure, wherein the registration procedure is an immediate assignment procedure, and the request message transmitted by the mobile terminal is a CHAN RQD message, and
wherein the device receives an IMM ASSIGNMENT reply message sent by the control unit in response to a first one of the request messages, and replaces the request reference in the IMM ASSIGNMENT reply message with the stored request reference from the last one of the request messages and forwards the IMM ASSIGNMENT reply message with the replaced request reference to the mobile terminal.

7. The mobile communications system as claimed in claim 6, wherein the base station and the device are arranged in an aircraft.

8. The mobile communications system as claimed in claim 6, wherein the base station and the device are arranged in a ship.

* * * * *